APPARATUS FOR STORING AND VISIBLY REPRODUCING IMAGES USING AN ELECTROLUMINESCENT CELL EXHIBITING PERSISTENT INTERNAL POLARIZATION

Filed April 19, 1965 2 Sheets-Sheet 1

INVENTOR:
HARTMUT P. KALLMANN
BY
Weingarten, Orenbuch & Lahive
ATTORNEYS

INVENTOR:
HARTMUT P. KALLMANN
BY
Weingarten, Orenbuch & Lahive
ATTORNEYS

United States Patent Office 3,484,752

Patented Dec. 16, 1969

3,484,752

APPARATUS FOR STORING AND VISIBLY REPRODUCING IMAGES USING AN ELECTROLUMINESCENT CELL EXHIBITING PERSISTENT INTERNAL POLARIZATION

Hartmut P. Kallmann, New York, N.Y., assignor to New York University, New York, N.Y., an educational corporation of New York Filed Apr. 19, 1965, Ser. No. 448,993
Int. Cl. G11b *11/00*
U.S. Cl. 340—173 7 Claims

ABSTRACT OF THE DISCLOSURE

An electroluminescent cell which exhibits persistent internal polarization for storage of a two dimensional image pattern to which the cell has been exposed by irradiation. The cell is prepared by application of a direct current potential of first polarity, after which it is irradiated with the image pattern while the potential across the cell is held at zero. The image is made visible by applying a potential of opposite polarity across the cell. A phosphorescent coating on one side of the cell may be employed to prolong image visibility.

Figure 1:
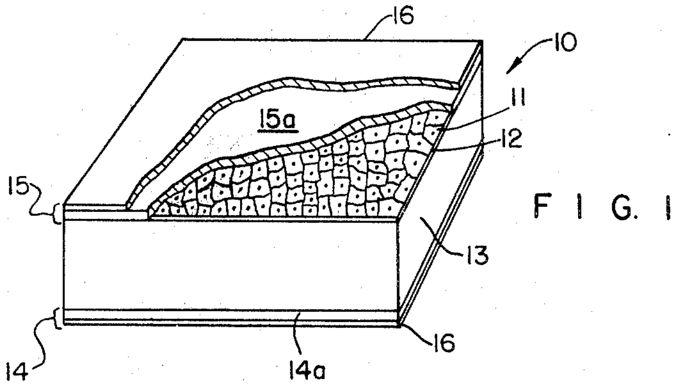

This invention relates in general to electroluminescent devices and more particularly to an improved and novel electroluminescent device capable of detecting, retaining, producing, and visibly displaying information stored in the device when exposed to invisible radiation or weak visible radiation.

The present invention utilizes an electroluminescent cell comprising a phosphor material usually embedded in a dielectric matrix which cell emits a light flash when energized by an external electric field. The intensity of the emitted light flash is believed to be related almost exponentially to the instantaneous field or the internal electric field created in the cell which electric field depends upon the previous history of applied external fields retained or remembered by the specimen. The intensity of the emitted light flash may be increased by increasing the instantaneous internal field strength in the specimen when applying the successive pulses of reverse polarity across the same.

This phenomenon is more fully described in a copending patent application Ser. No. 17,165 entitled "Light Producing and Memory Means" filed Mar. 23, 1960, by Hartmut P. Kallmann, Bernard Kramer and Eric Weissman, now Patent No. 3,235,850.

The electroluminescent material used herein must have a particular and unique electrical characteristic; namely, the property known as "persistent internal polarization," hereinafter called PIP. That is, the electroluminescent specimen must retain a polarized component of the electric field established in the cell by the previously applied voltage pulse for a relatively long internal. The remembered polarized residual component coacts with the next successive voltage pulse of opposite polarity to generate the enhanced light output.

The present invention is predicated on the discovery that the internal polarization, created by a previously applied external electric field, can be destroyed in selected areas by irradiation. Such destruction of the PIP is in selected areas corresponding to the image to be detected.

This invention operates in the following manner. After application to the cell of a DC voltage, the voltage is removed and the cell exposed to the radiation whereby a latent image is impressed on the entire surface of the cell. Following exposure, a DC voltage of polarity opposite to that of the previously applied pulse, is then applied to the cell so that the cell emits a light flash, which flash is bright in those areas not subjected to the radiation and weaker or non-existent in those areas struck by the radiation, thus producing a transient negative image of the radiation distribution to which the cell was exposed.

Thus, the present invention provides a means whereby such electroluminescent devices may be used to convert invisible radiation into visible radiation and to render visible images impressed on the total surface area of the cell by exposure of the cell to invisible radiation. Such use avoids the necessity of employing special films, developers, etc. as presently used, for example, in the arts of X-ray and infrared photography.

The present invention additionally provides a means whereby such impressed images may be stored for prolonged periods of time.

Further, by applying a coating of phosphorescent material to the cell a long-lasting visible picture corresponding to the pattern of applied radiation may be attained.

The invention has still a further advantage in that it can be utilized in the detection of low intensity images. Thus, the invention described herein may also be used to obtain an intensified picture of the image impressed on the cell.

Still further, the device may be used as a memory unit capable of divulging large amounts of stored information simultaneously as well as sequentially.

Figure 2:
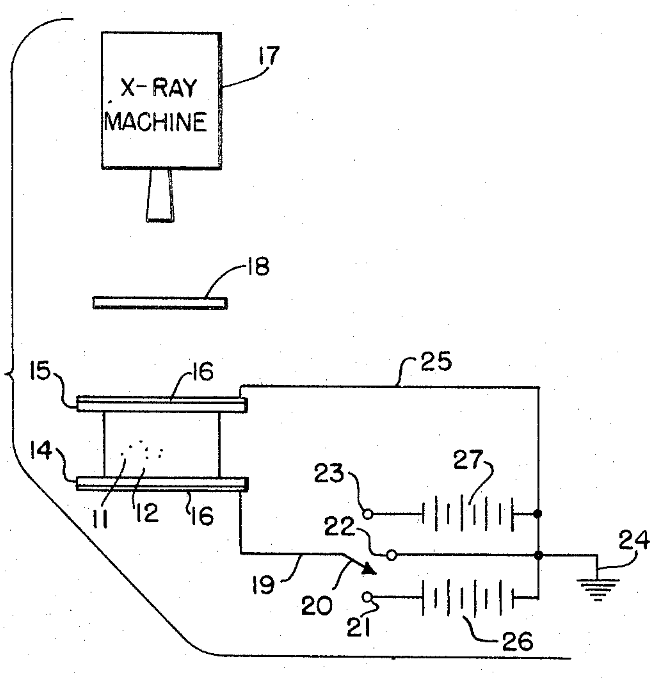
Figure 3A:
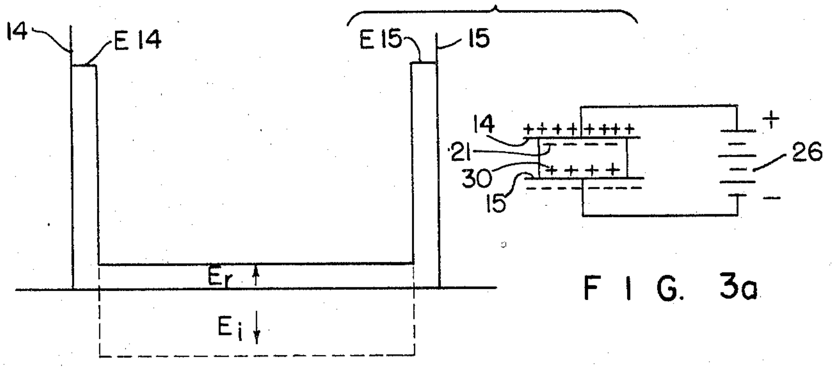
Figure 3B:
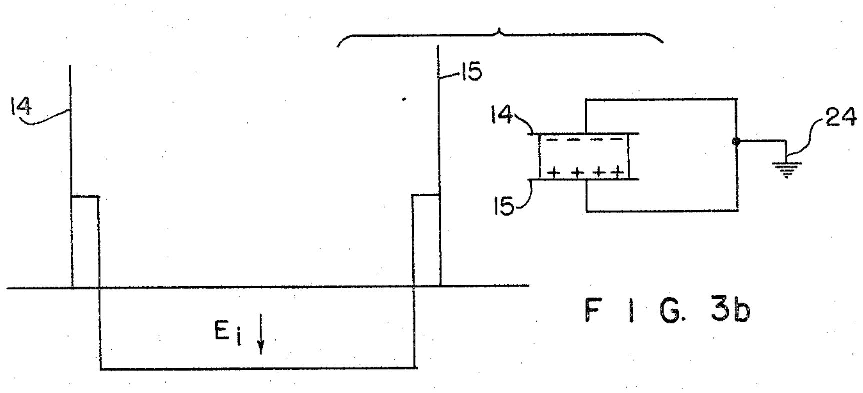

These and further features and advantages of the present method and means will become apparent from the following description wherein:

FIG. 1 is a perspective view of the device used in the production of such visible images from an invisible radiation exposure;

FIG. 2 portrays in schematic form a device used to convert X-rays to visible radiation;

FIG. 3*a* shows a diagram of the energy state of a single grain of the device immediately upon application of a first voltage;

FIG. 3*b* shows the energy diagram of a single grain of the device when both electrodes are grounded.

Figure 3C:
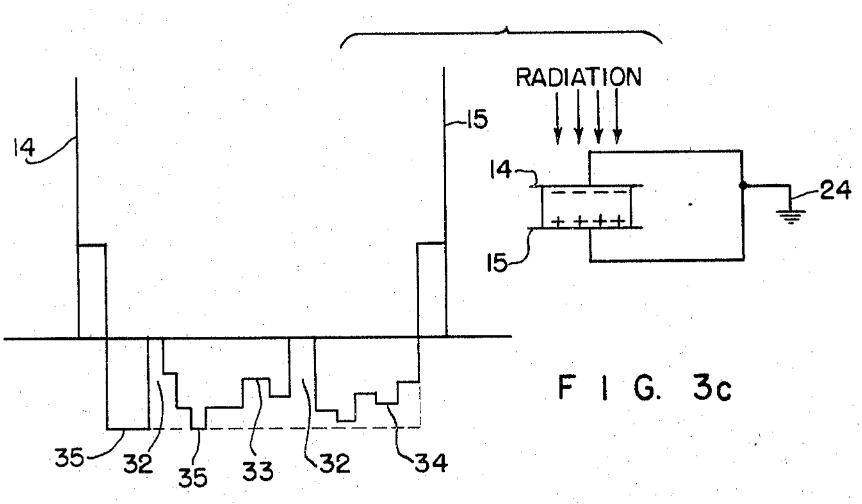

FIG. 3*c* depicts the same energy state after irradiation; and

Figure 4:
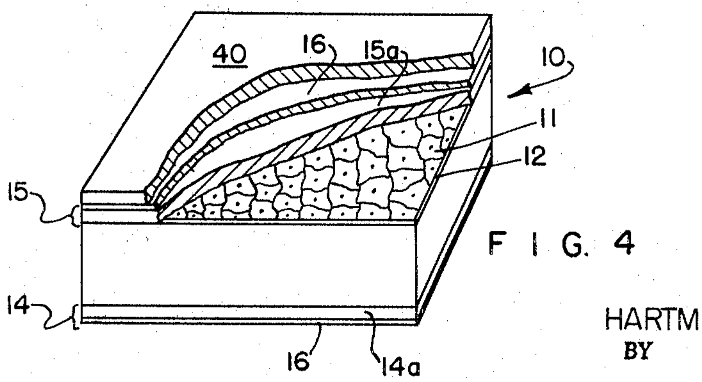

FIG. 4 illustrates a further embodiment of the device depicted in FIG. 1.

The basic cell 10 utilized in the present invention is depicted in FIG. 1 and comprises electroluminescent phosphor particles 11 isolately suspended in a dielectric binder 12 to form a matrix 13 which is secured to a suitably transparent electrode 14. It being understood that certain features of the material comprising the cell 10 have been greatly enlarged for purposes of the description. On the surface opposite electrode 14 and substantially parallel therewith is a second transparent electrode 15.

Phosphors found suitable for use in the present invention are commercially available, and copper doped zinc sulfide phosphors are typical. Dielectric binders found suitable for suspension of the phosphors may be, for example, castor wax or tricresyl phosphate. Other suitable dielectrics and phosphors have previously been reported in the literature and need not be enumerated here.

The electrodes 14 and 15 are preferably formed of insulating glass sheets **14*a* and 15*a* having a conductive coating 16** deposited on one surface thereof. When the device is used with visible or infrared radiation, Nesa coatings are suitable, but when the device is used with X-rays, an aluminum film should be used in place of one of the Nesa coatings. As is well known in the electronics art, such Nesa coating is a transparent tin oxide deposited by a well-known technique.

The devices may be made in the following manner. A dielectric binder 12 is selected and a powdered phosphor 11, having an average particle size of about ten microns, suspended therein at a ratio selected to achieve optimum results. The amounts of powdered phosphor and dielectric have been found not to be significantly critical, but it has been found desirable to use from two to three hundred (200–300) milligrams of powdered phosphor for a plate area of about ten (10) sq. centimeters and the quantity of the binder or dielectric employed should be approximately equal in volume to that of the powdered phosphor utilized. The phosphor 11 must be thoroughly mixed throughout the dielectric binder 12 so that each particle of phosphor is coated with the binder and thus isolated from every other particle by a coating of the dielectric. The mixture or matrix 13 is then deposited on previously coated glass sheet 14*a* and previously coated glass sheet 15*a* is placed on the deposited matrix 13. It is, of course, necessary that the matrix 13 is not in contact with the conductive surface 16 on the sheet and that the glass be between the mixture and the coating 16.

Although the above cell 10 has been described as a powdered material dispersed in a binder, it should be noted that the powdered material can be a thin layer of phosphor which has been evaporated onto the conductively coated glass sheet 14*a* for example, with the other conductively coated glass sheet 15*a* placed on top of the evaporated layer. It has also been found that a single crystal of the phosphor may be successfully substituted for the powder dispersed in the binder.

FIG. 2 is a schematic reproduction of a cell specimen 10 used in conjunction with an X-ray machine 17 to determine, for example, the presence of defects such as voids or occlusions in a non-transparent body 18. The cell 10 is the device previously described in conjunction with FIG. 1.

Electrode 14 is connected by lead 19 to a switch arm 20 which is adapted to make contact individually with terminals 21, 22 or 23. The electrode 15 is connected to ground plane 24 by conductive lead 25. A positive DC voltage +v., from a suitable source such as battery 26, is applied across the specimen 10 when switch 20 is connected to terminal 21. A DC voltage of opposite polarity —v., from a second suitable source such as battery 27, is connected across specimen 10 when switch arm 20 is connected to terminal 23. When switch arm 20 is connected to terminal 22 both electrodes, 14 and 15, are connected to ground plane 24. Other known and varied electronic and mechanical switching techniques or mechanisms may be used to effect the foregoing application for the purpose of supplying voltage across cell 10. Further, it should be understood that a single suitable source could be used to supply both voltages.

In describing the operation of the invention, it is necessary that reference now be made simultaneously to FIGS. 3*a*, 3*b*, and 3*c*. It will be assumed that the specimen 10 is initially unpolarized, that no radiation is impinging thereon, and that arm 20 is connected to terminal 22 such that both electrodes 14 and 15 are grounded. The magnitude of the applied voltages applied by means of batteries 26 and 27 directly affects the brightness of the light obtained from the unit since the intensity of the emitted light will vary almost exponentially as a function of the magnitude of the voltages applied across the cell 10. Thus, the voltages can be of equal or unequal magnitude; that is to say, if we assume that the voltage +v. applied by battery 26 to cell 10 is of a selected magnitude then the voltage applied by battery 27, namely, —v., can be equal to or larger or smaller than +v. However, in no event can any of the voltages applied be sufficient to cause dielectric breakdown.

When arm 20 is disconnected from terminal 22 and placed in contact with terminal 21, a positive voltage +v. from battery 26 is applied to the cell 10 and an energy state is established therein as illustrated in FIG. 3*a*. For purposes of illustration only, the cell 10 will be assumed to be composed of only a few grains. It being understood that in actuality the cell is composed of a great multiplicity of grains each isolated from each other by the dielectric binder 12.

The references 14 and 15 in curve 3*a* depict the position of the cell electrodes 14 and 15. The ordinate axis indicates the electric field strength applied to the cell 10 and the field produced. Upon application of voltage +v. to cell 10, free charges, i.e. holes 30 and electrons 31 are generated in the interior of cell 10 and a relatively strong electric field E*e* is established contiguous with the charged electrodes 14 and 15 as shown by E14 and E15. These charges, being free, drift towards the electrodes under the influence of the applied field. Thus, the holes drift towards electrode 14 and the electrons drift towards electrode 15. Since the conductive portions of the electrodes are isolated from the matrix, these charges do not combine with the electrostatic charges on the electrodes 14 and 15, but rather remain in the matrix 13. Since these free charges are opposite in polarity to the charge on the plates, they set up in the cell 10 an internal field E*i* which is opposite to that of the applied external field. The strength of the opposite polarity internal field E*i* is relatively small and overcome by the large applied external field E*e* such that the integral of resultant field E*i* is equal to the energizing voltage +v.

Immediately upon breaking of the connection between switch arm 20 and terminal 21, the switch is connected to terminal 22 so as to ground electrodes 14 and 15. Upon grounding, the cell 10 emits a small flash of light. This flash of light is caused by recombination of a small fraction of the free charges generated in the body by the electric field. However, because of the peculiar properties of the matrix 13, namely, the property of persistent internal polarization (PIP), the bulk of the generated free charges does not recombine but rather remains trapped in the matrix 13.

A plausible explanation, though not necessarily the correct or complete explanation, is that the free charges that do not recombine remain trapped at grain boundaries, dislocations or other such defects in the material or at the interface of the material and the electrodes 14 and 15. Such trapping would also tend to explain why the internal field of the matrix is smaller than the applied external field. Some charges so trapped at grain boundaries will see on the other side of the boundary opposite charges. Such opposing charges will, of course, effectively neutralize each other so that they do not contribute to the overall internal field. However, they will contribute to recombination and thus emission of light. When the arm 20 is switched from terminal 22 to terminal 23, a negative voltage is applied to the cell from battery 26. Simultaneously with the application of the negative voltage, the cell 10 emits a uniform flash of light. The intensity of this light flash is significantly greater than the flash emitted when the arm 20 was switched from terminal 21 to terminal 22 and may be increased substantially by increasing the strength of —v. in relation to +v. A high intensity light flash produced in this manner will be observed even if the second voltage (—v.) is applied to the cell 10 hours after the prior voltage (+v. Certain combinations of dielectrics and phosphors have been reported to retain the PIP for nearly 2000 hours. This phenomenon is indicative that a cell 10 will remember for an appreciable time interval whether it had been previously activated.

It should be apparent that the sequence of the applied voltages can be reversed, in other words, the voltage (—v.) could be applied first. In any event, upon application of the second voltage, the cell will indicate the polarity of the actuating signal with respect to the polarity of the previously applied signal to emit an intense light flash.

Assuming now that the cell specimen 10 is charged by connecting arm 20 to terminal 21 so that an energy state is created in cell 10 as depicted in FIG. 3*a*, upon disconnection of arm 20 from terminal 21 and connection of arm 20 to terminal 22, the cell 10 will retain an electric field because of its persistent internal polarization as previously explained even though the potential on the electrodes 14 and 15 is reduced to zero. Application of X-rays, for example, from X-ray machine 17 through specimen 18 which is being irradiated, destroys or depletes either totally or partially, this persistent internal polarization. Thus, in selected areas, such as 32, the energy previously stored therein, is totally depleted or destroyed and in other areas such as 33 and 34, the energy is only partially depleted or destroyed, while in still other areas 35 the stored energy is unaffected. Thus, there may be imposed upon cell 10 an X-ray image of the specimen 18. If we assume for the moment that specimen 18 is a plate of material in which defects such as voids or occlusions are to be detected, then areas 35 could, for example, correspond to those areas in which no defect existed in the specimen 18, while areas 32 could correspond to a void in the material and areas 33 and 34 could correspond to other defects, such as occlusions.

It should, of course, be remembered that the entire surface of the cell 10 is being exposed to the radiation image which comprises a pattern of radiation and non-radiation and that a total picture of specimen 18 is impressed on cell 10.

The switch arm 20 would now be connected to terminal 23 so that a negative voltage (—v.) is applied to the specimen 10. Upon application of the negative voltage (—v.) the unit cell 10 will emit a flash of light corresponding to a negative reproduction of the image stored in or impressed on unit 10. Thus, those areas 35 which retain the originally stored energy will emit brighter flashes of light than those areas 33 and 34 in which the energy has been partially destroyed. Further, the flash emitted from area 35 may be up to 100 times greater than the flash emitted from area 32.

In this way, a visible pictorial image of the X-ray profile of specimen 18 can be obtained directly without the necessity of employing films, developers, etc. Further, since the X-ray image can be retained in cell 10 for a considerable period of time after the irradiation of specimen 18 has been stopped, one can observe the visible picture in places other than that where the X-ray image was impressed. Thus, there is produced a device capable of projecting a reproduction of X-ray images in a manner previously unattainable and which eliminates the necessity of conventional X-ray photography using film, developers, etc. Further, because the images stand in cell 10 may be extracted and seen in an area apart from where the X-ray irradiation occurred and may be seen at any time after the X-ray radiation has been extinguished, radiation danger to the observer is eliminated and the hazards of the previously known fluoroscope machine is completely abolished.

It should be understood, of course, that although invisible radiation such as X-rays have been described in the above example that any radiation, visible or invisible, ranging from the infrared to gamma radiation may be used.

Since the destruction of the PIP is dependent not only on the intensity of the radiation but also on the time the unit is exposed, the device so described may also be used for the detection and viewing of low level radiation. As is known, many image converters such as television pickup cameras, are available. These converters have, however, high noise levels and thus cannot detect low intensity radiation. Use of the present invention can aid in viewing such low level radiation.

The present invention would be charged in the manner previously described so that a uniform PIP exists therein. Exposure of the cell 10 to the low level radiation for an extended period of time will result in impressment of an image in the cell by selective depletion of the PIP. After a sufficient exposure time, the cell may be activated so as to emit a strong, highly intense flash, which flash will be significantly greater than the noise level of the converter. The converter would then pick up the image and transmit it in the usual manner.

Further, since the device has long retention or storage time, it may be used as a memory unit. Still further, the device can be used as a memory unit which is capable of playing back large amounts of stored information in one step. To achieve this peculiar advantage it is necessary that the unit be charged in the manner previously described. The information to be stored can be impressed through the surface of the cell. By utilizing a device such as a flying spot scanner, large amounts of information may be stored since only small portions of the cell would be used to store the information. If desired, the surface could, for convenience, be laid out with a grid or other sectioning pattern. The information storage would be accomplished by selective discharge of the PIP or by selective production of the PIP such that areas of the cell would have no retained field, a partially retained field or a totally retained field. If an opposed voltage is then applied the stored information could all be extracted at once in the form of one visible picture.

This visible picture lasts only for a short moment, therefore, it is desirable to make this image last longer. This can be done by covering the glass layer of the Nesa electrode, through which the image appears, with a phosphor coating 40 which has a certain persistence, as shown in FIG. 4. The device shown in FIG. 4 is otherwise the same as that previously described. Such phosphor absorbs the light emitted by the device 10 and emits light slowly, thus lengthening the duration of the emitted image.

A much longer duration of the image can be obtained when device 10 is directly mounted on the input of a vidicon scanner which operates into a storage scope. In this way an image of short duration is transferred in a permanent one on the scope.

Instead of using a vidicon for transferring the instant picture into electrical signals one can also use a PIP plate mounted on the device 10. The polarization image produced on this plate by the light emitted from device 10 can be scanned by a light beam from a television tube for instance, and the polarization released fed into the storage scope where a permanent picture is produced.

Such a device may be particularly useful in the X-ray field or similar field where the radiation to be detected acts on device 10 and only later, perhaps, in another location the stored information is released and can be studied almost permanently with the above-described storage scope.

Another method to obtain a permanent record of the information collected and stored is the following. The outside surface of the electrode of device 10 through which the visible image is released is coated with another transparent electrode and on this electrode, a layer of PIP material is provided, which is also covered by an electrode. This PIP layer with its two electrodes can serve as PIP picture taking device in the usual manner. On the PIP layer the visible light released impresses a pattern of persistent polarization which can be made visible by removing the electrode from the PIP layer and using a toner to make the latent PIP pictures visible.

The device 10 produces a negative image of the radiation to be depicted. When the image is released the areas which were hit by the radiation to be depicted appear less bright than the areas which were not irradiated. One can easily reverse the situation and obtain a positive picture of the radiation to be detected by placing the device 10 after it has received the information on a similar device 10', which now will be energized by the light released by device 10. This light released the polarization in the respective areas of device 10'. Thus, those areas appear darker than the other areas when the light of device 10' is released by field application. Consequently, the areas hit by the original radiation appear darker in the image released by device 10 but brighter in the image released by device 10'. Thus, one obtains a positive image of the original radiation. The entire system can be considered as an image amplifier. A weak or invisible radiation is put into device 10 and a brighter image comes out of device 10'.

Although the method and means have been described in this application in conjunction with an X-ray machine 17, it should be obvious that any radiation producing or freeing charges, may be utilized. Thus, the described device may be utilized by being exposed to any radiation extending from the infrared through gamma radiation. The radiation so used may be either particulate or broad band. Further, a combination of these frequencies may also be used.

It should also be understood that although certain materials have been described, other materials are also available. It should also be understood that although the device has been shown in conjunction with an industrial application for determining defects in a material, that this device may also be used successfully in other arts.

It should also be apparent that it is within the scope of the invention that opposite polarity pulses could be used without the necessity of going through a grounded position.

Since other features and applications may now become apparent to those skilled in the art, it is respectfully requested that the invention not be limited by the foregoing preferred embodiment but limited only by the appended claims.

What is claimed is:

1. Apparatus comprising a body composed of particles of electroluminescent material suspended in a binder together capable of exhibiting the properties of persistent internal polarization and electroluminescence having a first side and a second side, a conductive electrode on said first side, a conductive electrode on said second side, means for applying a direct current potential of a selected polarity across said electrodes to store an electrical field in said body, means for reducing said electrical potential on said electrodes to zero, means for irradiating said body with an image pattern to deplete portions of said internal field and means for applying a direct current potential of polarity opposite to said first direct current potential to said electrodes to produce the emission of light from said body and form a visible image that is a negative of said radiation image pattern.

2. Apparatus comprising in combination a body composed of particles of electroluminescent material imbedded in a binder which together exhibit the property of persistent internal polarization, having on each side a homogeneous, transparent conductive electrode, a layer of phosphorescent material on the surface of one electrode, means for applying a direct current potential to said electrodes to produce in said body a uniform persistent internal polarization, means for reducing said potential to zero, means for exposing said body to a radiation pattern to selectively deplete portions of the persistent internal polarization to form in said body an image that is a negative of the irradiation and means for applying an electric field of opposite polarity to said body to produce electroluminescence in said body which causes said layer of phosphorescent material to emit light of long duration.

3. Apparatus described in claim 2 wherein said electroluminescent material is a powder, said binder is a dielectric material, and each of the electroluminescent particles is coated with said binder and isolated from adjacent particles by said binder.

4. A device of claim 1 having said first electrode transparent to the irradiating radiation and said second electrode transparent to the electroluminescence emitted by the body.

5. The apparatus of claim 2 wherein said binder comprises castor wax.

6. The apparatus of claim 2 wherein said electroluminescent material comprises a powder of doped zinc sulfide phosphor having an average particle size of about 10 microns.

7. The apparatus of claim 1 wherein said cell is mounted directly on the input of a vidicon scanner which operates into a storage scope.

References Cited

UNITED STATES PATENTS

| | | | |
|---|---|---|---|
| 2,912,592 | 11/1959 | Mayer | 340—173 X |
| 2,924,732 | 2/1960 | Lehmann | 250—80 X |
| 3,010,043 | 11/1961 | Wahlig | 250—80 X |
| 3,268,331 | 8/1966 | Harper | 340—173 X |
| 3,005,707 | 10/1961 | Kallmann et al. | 340—173 |
| 3,211,663 | 10/1965 | Buleza | 313—108 |
| 3,235,850 | 2/1966 | Kallmann et al. | 340—173 |

BERNARD KONICK, Primary Examiner

JOSEPH F. BREIMAYER, Assistant Examiner

U.S. Cl. X.R.

250—71, 80; 313—108